(12) United States Patent
Lebendt et al.

(10) Patent No.: US 10,844,786 B2
(45) Date of Patent: Nov. 24, 2020

(54) METHOD FOR THE PREDICTIVE MAINTENANCE OF INTERNAL COMBUSTION ENGINE COMPONENTS BY MEANS OF A STRUCTURE-BORNE SOUND SENSOR

(71) Applicant: IAV GmbH Ingenieurgesellschaft Auto und Verkehr, Berlin (DE)

(72) Inventors: Thomas Lebendt, Berlin (DE); Ingo Friedrich, Kleinmachnow (DE); Robert Mollik, Berlin (DE)

(73) Assignee: IAV GMBH INGENIEURGESELLSCHAFT AUTO UND VERKEHR, Berlin (DE)

( * ) Notice: Subject to any disclaimer, the term of this patent is extended or adjusted under 35 U.S.C. 154(b) by 0 days.

(21) Appl. No.: 16/660,833

(22) Filed: Oct. 23, 2019

(65) Prior Publication Data
US 2020/0131987 A1   Apr. 30, 2020

(30) Foreign Application Priority Data
Oct. 24, 2018   (DE) .......................... 10 2018 126 501

(51) Int. Cl.
*F02D 41/22*   (2006.01)
*F02B 77/08*   (2006.01)
(Continued)

(52) U.S. Cl.
CPC .......... *F02B 77/083* (2013.01); *F02B 77/085* (2013.01); *G01M 15/12* (2013.01);
(Continued)

(58) Field of Classification Search
CPC ..... F02B 77/083; F02B 77/085; G06N 20/00; G01M 15/12; G01M 15/04;
(Continued)

(56) References Cited

U.S. PATENT DOCUMENTS 4,483,185 A   11/1984 Kunzfeld
9,933,334 B2   4/2018 Rivellini
(Continued)

FOREIGN PATENT DOCUMENTS

CA   2609718 A1   2/2008
DE   3004605 A1   8/1981
(Continued)

*Primary Examiner* — Hai H Huynh
(74) *Attorney, Agent, or Firm* — Leydig, Voit & Mayer, Ltd.

(57) ABSTRACT

A method for predictive maintenance of components of an internal combustion engine by a structure-borne sound sensor includes: recording vibrations of the components of the internal combustion engine by at least one structure-borne sound sensor; and during operation of the internal combustion engine, continuously checking a release for diagnosing a wear condition of the components of the internal combustion engine. The one or more structure-borne sound sensors, which are arranged at one or more positions on the internal combustion engine, record measurement signals and forward them to evaluation electronics. The measurement signals are time-synchronized to a characteristic state of the internal combustion engine or the measurement signal recording is time-triggered. The time-synchronized or triggered measurement signals are decoded into measurement data. The decoded measurement data is subjected to a signal transformation. One or more spectrograms are generated from the signal transformation.

10 Claims, 4 Drawing Sheets

(51) Int. Cl.
  *G06N 20/00* (2019.01)
  *G01M 15/12* (2006.01)
  *G06F 17/14* (2006.01)
  *G06F 17/18* (2006.01)

(52) U.S. Cl.
  CPC ....... *G06N 20/00* (2019.01); *F02D 2200/023* (2013.01); *F02D 2200/101* (2013.01); *F02D 2200/1002* (2013.01); *G06F 17/14* (2013.01); *G06F 17/18* (2013.01)

(58) Field of Classification Search
  CPC ....... F02D 2200/023; F02D 2200/1002; F02D 2200/101; F02D 2200/025; F02D 2009/0233; F02D 2250/14; F02D 35/027; F02D 41/28; F02D 41/22; F02D 2041/228; F02D 2041/288; Y02T 10/40; G06F 17/14; G06F 17/18; G01H 1/003; G01H 1/00
  USPC .......... 123/192.1, 198 D, 435; 701/106, 107, 701/111; 73/35.09, 114.07
  See application file for complete search history.

(56) References Cited

U.S. PATENT DOCUMENTS

| | | |
|---|---|---|
| 2002/0095978 A1 | 7/2002 | Muhlberger et al. |
| 2003/0145813 A1 | 8/2003 | Buhl et al. |
| 2016/0103038 A1 | 4/2016 | Lacaille |
| 2016/0240017 A1 | 8/2016 | Gouby et al. |
| 2018/0052068 A1 | 2/2018 | Dame et al. |

FOREIGN PATENT DOCUMENTS

| | | |
|---|---|---|
| DE | 19548279 A1 | 4/1997 |
| DE | 19917772 A1 | 10/2000 |
| DE | 10028995 A1 | 12/2001 |
| DE | 10157514 A1 | 6/2003 |
| EP | 3095992 A1 | 11/2016 |
| EP | 3269969 A1 | 1/2018 |
| GB | 2462927 A | 3/2010 |
| KR | 20180020390 A | 2/2018 |
| WO | WO 2015052408 A1 | 4/2015 |
| WO | WO 2016123303 A1 | 8/2016 |

METHOD FOR THE PREDICTIVE MAINTENANCE OF INTERNAL COMBUSTION ENGINE COMPONENTS BY MEANS OF A STRUCTURE-BORNE SOUND SENSOR

CROSS-REFERENCE TO PRIOR APPLICATION

Priority is claimed to German Patent Application No. DE 10 2018 126 501.8, filed on Oct. 24, 2018, the entire disclosure of which is hereby incorporated by reference herein.

FIELD

The present invention relates to a method for the predictive maintenance of internal combustion engine components, in particular of a valve drive, by means of a structure-borne sound sensor.

BACKGROUND

Internal combustion engines, which use structure-borne sound sensors to control the ignition timing, utilize the most rudimentary embodiment to do this by recording vibration signals in the combustion chamber area during the ignition process. The signal from the structure-borne sound sensor, which is a knock sensor, is compared with a reference value. The ignition timing of the cylinder is shifted over time depending on the deviation from this reference value. Further applications exist for structure-borne sound or knock sensors in internal combustion engines in the current state of the art. Misfires or component damage are thus inferred via the recorded knock signals. In dual fuel engines, such as diesel gas dual fuel systems, the use of knock sensors for adjusting the ignition timings of the individual cylinders in gas operation is advantageous. Knock sensors are also used in particular in the case of large engines for wear detection, preferably for valve drive wear.

The patent specification DE3004605C2 presents a process for measuring the valve clearance of an internal combustion engine, wherein an acoustic signal from the combustion chamber of the internal combustion engine is recorded with a knock sensor. The recorded signal is evaluated in a special measuring window and compared with a reference value. If the measured value exceeds the reference value, the result of an electronic evaluation of this difference is an indication that the valve drive has too much clearance. To reduce the computing effort and the amount of data, the measuring window for detecting the opening and/or closing sounds of the gas exchange valves is opened only in critical time ranges. The signal to be evaluated is the amplitude of a single frequency or a frequency spectrum within the time range. The time ranges are minimized in such a way that interfering signals, such as the knocking sound of the internal combustion engine, are masked out. The reference signal is recorded and stored in a normal state of the valve clearance.

Patent specification DE19917772B4 reveals a valve clearance monitoring device which is preferably applied to self-igniting internal combustion engines with common rail injection technology and without hydraulic valve clearance adjustment. Here, one or more knock sensors are mounted in one or more injectors. The signal is recorded in defined measuring windows in order to reduce computing time and the influence of interfering signals. The measuring windows include the closing processes of the gas change valves respectively and they are activated cyclically in certain time intervals or can be switched on during critical operating states of the internal combustion engine. Cold start or full load operation are mentioned here as critical operating states of the internal combustion engine. Analogously to the state of the art, data recorded within the measuring windows are evaluated with regard to their frequency amplitudes and compared with previously stored limit values. The existing valve clearance is qualitatively evaluated via an electronic evaluation unit. In addition, this is used to deduce possible valve train wear and to check the functionality of the injection valves. The measurement data is stored and a maintenance history is generated. The maintenance history and valve clearance monitoring enable state-based maintenance intervals so that the maintenance of the valve drive of an internal combustion engine can no longer be performed at fixed intervals, but only after input of the maintenance information.

In the published patent application KR20180020390A, a process for monitoring the valve drive by means of a knock sensor is presented, wherein knocking, misfiring and damage to the valve drive are monitored by a knock sensor and associated evaluation electronics. The signal of a knock sensor is digitalized and transferred to two separate evaluation ranges of the evaluation electronics. The two evaluation ranges filter the signal of the knock sensor according to specific frequency bands. One evaluation range filters the signal of the knock sensor according to a predefined frequency band which is characteristic for knocking and another evaluation range filters the signal of the knock sensor according to a predefined frequency band which is characteristic for misfiring. If knocking is detected in a cylinder, this information is transmitted to a control unit of the evaluation electronics, which adjusts the injection to the respective cylinder. If a misfire or damage to the valve is detected in the other evaluation range, this information is forwarded to the control unit of the evaluation electronics and the affected cylinder is continuously monitored. In addition, a warning can be issued and/or the internal combustion engine stopped.

The prior art for valve drive wear detection by means of structure-borne sound sensors is essentially characterized by the fact that the measurement data is collected and evaluated by the signals from one or more knock sensors in time windows dependent on the operating point of the internal combustion engine. The time windows are optimized to the extent that they require the lowest possible computing power for evaluating the measurement data and provide a qualitative statement about the valve clearance using the lowest possible amount of data. For this purpose, the time windows are activated at predefined time intervals, such as during the closing operations of the gas exchange valves, or are activated at full load or during the cold start of the internal combustion engine. The qualitative evaluation of an error case is performed by comparing the amplitudes of relevant frequencies with predefined reference values. Using separate evaluation for separate frequency ranges, the error cases can be traced back to different causes such as valve clearance, misfiring or component damage. Fixed intervals can be extended to state-based maintenance intervals, especially for large engines, on the basis of a maintenance history documented in this manner.

The disadvantages of the prior art for valve train drive detection technology by means of structure-borne sound sensors result from the fact that selected measurement windows for collecting measurement data are, in particular, minimized in order to comply with the limited computing power. A comparison of frequency amplitudes with respect to a reference value, however, only allows a qualitative statement about the valve clearance. The division into predefined frequency ranges for determining wear causes is disadvantageous in that the frequencies of different wear mechanisms are scattered over wide ranges of the frequency spectrum within a cylinder head of an internal combustion engine, which in turn limits the existing information to the application. State-based maintenance intervals continue to indicate exclusively a wear warning when a limit value is exceeded.

SUMMARY

In an embodiment, the present invention provides a method for predictive maintenance of components of an internal combustion engine by a structure-borne sound sensor, comprising: recording vibrations of the components of the internal combustion engine by one or more structure-borne sound sensors; and during operation of the internal combustion engine, continuously checking a release for diagnosing a wear condition of the components of the internal combustion engine, wherein the one or more structure-borne sound sensors, which are arranged at one or more positions on the internal combustion engine, record measurement signals and forward them to evaluation electronics, wherein the measurement signals are time-synchronized to a characteristic state of the internal combustion engine or the measurement signal recording is time-triggered, wherein the time-synchronized or triggered measurement signals are decoded into measurement data, wherein the decoded measurement data is subjected to a signal transformation, wherein one or more spectrograms are generated from the signal transformation, wherein the one or more spectrograms are evaluated by one or more mathematical regression models in the evaluation electronics, and the release for diagnosing the state of wear of the components of the internal combustion engine is simultaneously re-tested, wherein, when a release is issued, a process, starting with the signal recording by the structure-borne sound sensor or sensors, runs again until the release expires, wherein an average value is calculated from evaluations generated in this manner so that the average value represents a measurement of the wear of the analyzed component, and wherein the average value is transferred to further units for further processing.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a method for the predictive maintenance of internal combustion engine components by means of a structure-borne sound sensor on the basis of a quantitative determination of wear, especially with regard to valve clearance. In this case, the wear should be calculated as a real physical value and the specific maintenance case predicted.

The object is achieved by a process for the predictive maintenance of internal combustion engine components by means of a structure-borne sound sensor, which enables a quantitative statement about the calculated wear.

The method according to the invention is applied to components of an internal combustion engine with at least one cylinder head in which at least one cylinder is arranged, wherein a piston is arranged so that it can move inside the cylinder via a piston rod. Together with the end face of the piston, the cylinder forms the working chamber of the internal combustion engine, to which working fluid is supplied and withdrawn via gas exchange valves. The components analyzed by the method for their wear condition can be mechanical components, such as, in particular, the valve drive, but also pistons, bearings, injection valves or turbochargers. The process according to the invention essentially comprises the general process steps Developing a mathematical regression model,
Recording measurement signals,
Preparation of measurement data,
Calculating the state of wear,
Transfer of data,
Further processing of data.

The mathematical regression model is the decisive tool for checking the wear condition of the considered component of the internal combustion engine from input variables, which may be the measurement signals of a structure-borne sound sensor. The components of the internal combustion engine to be analyzed are the gas exchange valves for the specific application of valve drive wear, and the valve clearance is monitored as a measurement of the wear condition. The development of the mathematical regression model describes an iterative process, wherein the regression model has to be matched to the applied internal combustion engine by machine learning. To this end, it is necessary to process a plurality of measurement data from different operating points of the internal combustion engine. Thus, the development of the regression model is especially at odds with the goal of generating an evaluation that is as accurate as possible by processing complex measurement data and at the same time preventing over-adjustment of sample measurement data. The first step in the development of the regression model therefore involves setting a predefined valve clearance in the gas exchange valves of the internal combustion engine in accordance with the invention. Alternatively, subsystems of the internal combustion engine, which represent the basic functionality of the component to be analyzed, can also be arranged on a component test bench. In an advantageous embodiment, the cylinder head and the valve train are checked on a component test bench. In a second step, the operating state of the internal combustion engine is set to a predefined operating point. A stationary operating point is set in an advantageous version of the procedure according to the invention, wherein the internal combustion engine is operated on an engine test bench. The stationary operating point of the internal combustion engine results from a combination of speed and load, wherein the rotational speed is kept constant. Alternatively, the internal combustion engine can be operated in a vehicle or another device, so that a defined valve clearance and a defined operating state of the internal combustion engine can be set. The operating state of the subsystem is set analogously to the operating state of the real internal combustion engine in an advantageous embodiment of the method according to the invention, wherein a subsystem of the internal combustion engine which represents the basic functionality of the component to be analyzed is operated on a component test bench. In a further step, measurement signals are recorded by one or more structure-borne sound sensors. In an advantageous embodiment of the method according to the invention, the structure-borne sound sensors are knock sensors. The number and position of the knock sensors can be suitably designed to suit the application. According to the invention, a single knock sensor is advantageously used, which is positioned in such a way that it is positioned in the immediate vicinity of the component to be analyzed and is oriented coaxially in its axial orientation according to the preferred direction of the vibration propagation. For the specific application of valve drive wear, the knock sensor is integrated in the cylinder head, has a minimum distance to all cylinders of the cylinder head and is aligned coaxially to the cylinders in its functional axial alignment. Alternatively, the structure-borne noise sensors can be any other vibration sensors by means of which the oscillation state of the component of the internal combustion engine to be analyzed can be detected. The positioning of the oscillation pick-ups on the internal combustion engine or subsystems is particularly restricted by the design in a constructive manner, wherein their positioning constitutes a compromise between the acoustically optimal position and the existing geometry. The oscillation pick-up or pick-ups can be easily retrofitted to existing bores or screw connections. Alternatively, knock sensors already integrated into the internal combustion engine can be used as oscillation pick-ups. The number and position of the oscillation pick-ups are to be designed variably for a suitable signal recording. In a further step, the measurement signals of the structure-borne sound sensors are transmitted to evaluation electronics. The evaluation electronics can be part of an already existing control unit of the vehicle or of the device in which the internal combustion engine is operated, or an additional computing unit which is arranged in the vehicle or the device or on an external central server. In a further step, the recorded measurement signals are synchronized temporally to a characteristic state of the internal combustion engine. In the specific application of valve drive wear, the characteristic conditions relate to time ranges within a working cycle of the internal combustion engine and can be defined by a crank angle. According to the invention, it is advantageous to synchronize the measurement data to the upper dead center of the high-pressure phase of the first cylinder. Alternatively, the measurement signal recording can be triggered at the time of the start of the working cycle so that subsequent measurement signal synchronization is dispensed with. Additional devices and measurement technology may be required for this purpose.

In a further step for processing measurement signals from a plurality of work cycles, the measurement signals are decoded in such a way that the individual measurement data are each assigned to the same events of the working cycles. These events may be described by the crank angle of the internal combustion engine. A gear encoder may be used for this. Laser measurement technology is additionally used in an advantageous embodiment of the method according to the invention, wherein the regression model is developed by means of an internal combustion engine or a subsystem of the internal combustion engine which is arranged on an engine or component test bench, in order to detect the valve lift progression and thus to support the measurement data synchronization or decoding. Alternatively, additional devices and methods can be used to determine the valve lift or other characteristic variables that support measurement data synchronization and/or decoding. The measurement data prepared according to this method are subjected to a signal transformation in a further step. In an advantageous embodiment of the method according to the invention, the signal transformation is a Fourier analysis. Alternatively, other methods for signal transformation can be used. The signal is transformed for each measurement of a working cycle of the internal combustion engine, which corresponds to a crank angle range from 0 to 720° CA. Different frequencies are mapped here. For the specific application of valve drive wear, a frequency range of 0 to 30 kHz is advantageously analyzed according to the invention, whereby the relevant structure-borne sound range for these vibration stimulations is covered. The result of the signal transformation for the measurement data of a measurement data set, consisting of a defined valve clearance of a defined operating state of the internal combustion engine and a defined position of the structure-borne sound sensor relative to a working cycle, is a characteristic spectrogram. In the spectrogram, therefore, acoustic amplitudes are plotted over a crank angle between 0 and 720° CA and a frequency between 0 and 30 kHz. Alternatively, any other frequency range may be analyzed if this is important for the wear condition of a component. A reference point of the spectrogram, which consists of a crank angle, a frequency and a frequency amplitude, is hereinafter referred to as a "feature". There is a certain number of features per spectrogram depending on the resolution. According to the invention, an increment of 5° CA. is advantageously selected for the resolution of the crank angle so that a corresponding number of features results for a spectrogram. Alternatively, any suitable resolution which is economical with regard to the required computing power can be selected. In a further step, the spectrograms for the different measurement data sets are aggregated and serve as basic data for a mathematical regression model, which is initially preselected in a further step. According to the invention, a regression model based on a support vector machine for machine learning is used advantageously. Alternatively, any other methodology may be used to form mathematical regression models. The spectrograms of all measurement data sets are entered into the regression model. Based on the results of the regression model, the position of the structure-borne sound sensor or sensors can be adapted in a further step, with the aim of minimizing the deviation from the preset wear condition calculated by the regression model. In a further step, the measurement data for the model training of the regression model to be produced are filtered in such a way that the scattering of the result data is minimized. Iteration steps can be repeated with the filtered measurement data, wherein the regression model and the position of the structure-borne sound sensor or sensors can be further adapted. In a further step, the existing features of the spectrograms are reduced. A reduction of irrelevant or redundant features of the spectrogram leads to an increase in the model quality, but an insufficient number of features leads to information loss. In this case, any number of features can be optimized if it is possible to bring about an improvement in the model quality of the regression model. In a final step, the result of the regression model is now evaluated. The information obtained can be used in a further iteration for model training of the regression model. In accordance with the invention, the regression model is used until a sufficiently precise model quality is achieved, which is advantageous for the specific application of valve drive wear. For a sufficiently accurate model quality, a measurement accuracy of 0.01 can be approximated, which corresponds to a measurement accuracy of the conventional measuring methods from the prior art. In this state, the development of the mathematical regression model and thus the adaptation of the method in accordance with the invention to the applied internal combustion engine and the wear condition to be analyzed are completed.

The regression model devised in this way is now used in the method in accordance with the invention. The measurement signals are acquired in the first method step of the inventive method. The measurement signals detected by the structure-borne sound sensor are introduced into the inventive method when the wear condition is released for analysis. This release is linked to release conditions, wherein all release conditions must be fulfilled in order for the release to be issued. The release conditions are continuously checked by the evaluation electronics and consist of internal calculation variables or state variables which are received by further units. In an advantageous embodiment of the inventive method, the release conditions consist of a speed and/or a torque of the internal combustion engine and/or a speed of a vehicle, which is driven by the internal combustion engine and/or a fluid temperature and/or a number of the passes of the method which have followed one another directly to date. Speed, torque, and fluid temperatures, such as the oil or cooling water temperature, are included in the operating status of the internal combustion engine. Alternatively, further state variables and/or calculation may be used as release conditions. In accordance with the invention, the release conditions are advantageously fulfilled during a stationary operating point of the internal combustion engine and/or a stationary driving operation of the vehicle, which is driven by the internal combustion engine. The stationary operating point of the internal combustion engine can be described by a constant speed and/or a constant torque and at defined values of oil and cooling water temperature. The stationary driving operation of the vehicle can be described by a constant speed. Stationary operating points of the internal combustion engine and stationary driving operation are referred to as normal operation. Alternatively, the measurement signals of the structure-borne sound sensor or sensors can be processed by the inventive method in any further operating state of the internal combustion engine, provided that an associated regression model can map the required model quality in these operating states. Further units which provide information on the release conditions may be control devices which provide internal calculation and/or sensors which detect additional measurement signals. The parameters for the release conditions can be freely adapted and are applied to the respective internal combustion engine before the inventive method is used. The parameters can furthermore be used as standard parameters for structurally identical internal combustion engines. In accordance with the invention, the normal operation of the internal combustion engine is analyzed and the wear of the corresponding component is determined directly as a real value.

In a further process step of the inventive method, the measurement signals recorded by the structure-borne sound sensor or sensors are processed by the evaluation electronics in accordance with the development of the regression model with regard to measurement signal synchronization, measurement data decoding and the creation of spectrograms. In accordance with the invention, the evaluation electronics are advantageously located in a vehicle or a system in which the internal combustion engine is used so that the measurement signal is processed "on board". In a further advantageous embodiment of the inventive method, the measurement signals from the structure-borne sound sensor or sensors are loaded onto a central server via a data transfer unit and a local and/or mobile data connection, wherein the evaluation electronics are positioned outside the vehicle or the system which uses the internal combustion engine and process the data from the server.

In a further process step of the inventive method, the value for the wear condition is calculated. The spectrogram generated for the analyzed working cycle of the internal combustion engine is applied to the regression model adapted for the applied internal combustion engine. The regression model characterizes the underlying pattern in structure-borne sound so that a measurement of the wear condition is determined from the selected features of the spectrogram. The valve clearance is calculated in accordance with the specific application of valve drive wear. At the same time, the release conditions are checked again so that further working cycles of the internal combustion engine are detected metrologically by the structure-borne sound sensor or sensors when released. If the release is not issued, an average value is calculated for the wear condition from the currently generated plurality of calculated values. This average value constitutes the result of the calculation of the wear condition. In an advantageous embodiment of the inventive method, the number of calculations of the wear condition made directly and successively is a release condition so that the maximum number of measurement data sets for averaging the value for the wear condition can be limited. In accordance with the invention, the maximum number of values for averaging the value for the wear condition is advantageously limited to five in normal operation. Alternatively, any other number may be applied. Furthermore, a dynamic adaptation of the number of values for averaging is advantageous as a function of the operating state of the internal combustion engine.

The result data is transferred in a further process step of the inventive method. The result data of the evaluation electronics are transferred to the control unit of the internal combustion engine and/or to the central server and/or to any further unit which can further process this data. In an advantageous embodiment of the inventive method, wherein the internal combustion engine is arranged as a powertrain in a vehicle, the information interfaces of the evaluation electronics are connected to the data network of the vehicle so that the result data are transmitted to the control unit of the internal combustion engine within the network. At the same time, the result data is transferred via a mobile data connection to a central server via a data transmission unit which is integrated in the evaluation electronics.

In a final step of the inventive method, the result data are further processed. In an advantageous embodiment, the wear condition of a component determined by the regression model is further processed as a result on the control unit of the internal combustion engine and a central server. In the control unit, the wear condition serves as a diagnostic value and can be monitored for exceeding limit values and used further as an internal calculation. In the specific application of the valve drive wear of an internal combustion engine in a vehicle, the valve clearance is monitored and when a limit value is exceeded, a warning and/or maintenance instructions can be displayed in the vehicle. In addition, a valve clearance is an indication of changed opening and closing times of the gas exchange valves, which allows the thermodynamic calculations of the control unit of the internal combustion engine to be adapted. Improved knowledge regarding the combustion situation of the internal combustion engine can thus have a positive impact on the combustion products. Further data processing on the central server can begin at different stages of the inventive process. In accordance with the invention, the wear condition determined by the evaluation electronics is advantageously transferred to the central server and further processed in the form of statistical evaluations. In another advantageous embodiment of the inventive method, the processed spectrograms are already transferred to the central server, wherein a part of the evaluation electronics is relocated to this server. Here, the regression model is applied to the server, whereby the wear condition of the internal combustion engine is calculated externally. The result of the wear condition can be transferred to the control unit of the internal combustion engine again via the mobile data connection. Alternatively, the measurement signals are transferred from the knock sensor or sensors to the central server, wherein the entire evaluation electronics are relocated on the server. The entire measurement data preparation, such as the measurement signal synchronization, the measurement data decoding and the signal transformation, likewise ensues externally on the central server. The result of the wear condition can be transferred to the control unit of the internal combustion engine again via the mobile data connection. Alternatively, the information and data from each further process step of the inventive method can be processed either externally on a central server or locally internally in a vehicle or the device in which the corresponding internal combustion engine is applied. In the specific application of the valve drive wear of an internal combustion engine in a vehicle, wear history for the vehicle is generated on the central server by the transferred valve clearances, stored and updated with each new diagnosis. By statistically processing the data sets of a vehicle or a fleet of vehicles with structurally identical internal combustion engines, the inventive method can be acquired by different analysis methodologies of further components. By knowing the respective specific wear mechanisms, a wear history can be created relating to the different wear mechanisms in conjunction with adequately prepared regression models. When the wear history is extrapolated, not only the time of failure of the component but also the specific maintenance case can be predicted by adding further data via the internal combustion engine and its application. This allows individual maintenance measures to be reduced, spare parts management to be designed efficiently and planning and machine deployment to be optimized.

The measurement data is collected and the inventive method is adapted on an internal combustion engine, wherein the cylinder head of the internal combustion engine is operated as a subsystem on a component test bench. The internal combustion engine is a 121 six-cylinder diesel engine for use in commercial vehicles.

Figure 1:
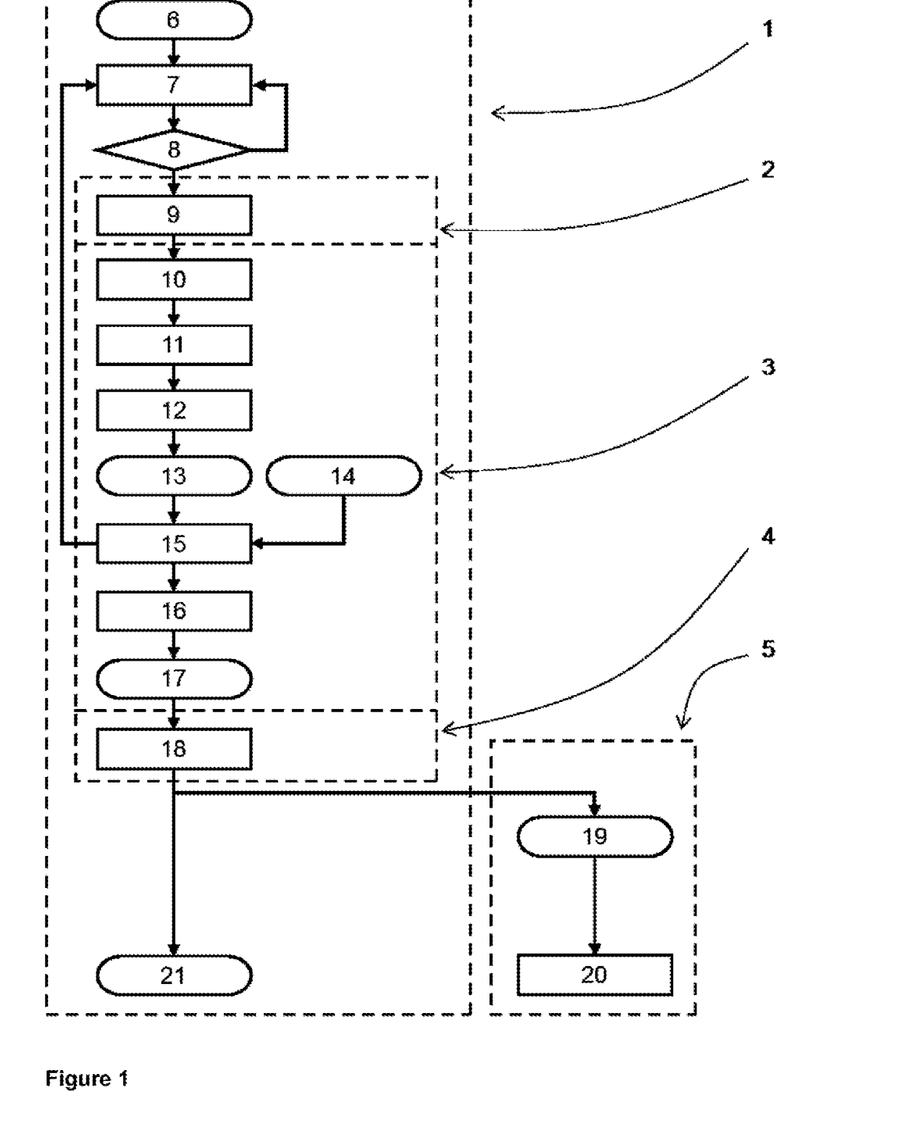
FIG. 1: Schematic flowchart of the inventive method, wherein the internal combustion engine and the evaluation electronics are arranged in a vehicle and the result of the wear condition is transferred to a central server for further processing.

FIG. 1 shows the schematic flow chart of the inventive method. The internal combustion engine is arranged as a powertrain in a motor vehicle (1). A structure-borne sound sensor (2) in the form of a knock sensor is mounted on the cylinder head of the internal combustion engine. An electronic evaluation unit (3) is arranged inside the vehicle and has interfaces to the knock sensor (2), the control unit of the internal combustion engine and to a data transfer unit (4). The data transfer unit (4) can load data of the evaluation electronics (3) via a mobile and/or local data connection to a central server (5). In the internal combustion engine, the valve clearance is to be determined as a parameter for valve drive wear. The initial state for the application of the inventive method is the operation of the internal combustion engine (6). During operation of the internal combustion engine (6), the release conditions for diagnosing the valve clearance are continuously monitored (7). The release conditions include the speed of the internal combustion engine, the vehicle speed, the oil and coolant temperature, and the number of diagnoses of the valve clearance that have already been followed consecutively. When the release conditions are met, the release is issued to the measurement signal recording (8) and the measurement signals generated by the knock sensor (2) are conducted into the active measurement signal recording (9). Active measurement signal recording (9) here means that the recorded measurement signals are transmitted to the evaluation electronics (3). If the release conditions are not met, no measurement signals are transmitted to the evaluation electronics (3). The measuring signals of the knock sensor (2) are transmitted to the control unit of the internal combustion engine and used for further internal functions in the control unit. The measurement signals recorded in the evaluation electronics (3) are synchronized (10) temporally in a first step of the measurement data preparation. The measurement signals are synchronized via the crank angle to the top dead center of the high-pressure phase of the first cylinder within a working cycle of the internal combustion engine. In a further step, the measurement data is decoded and assigned to the same events of the working cycle (11). In a final step of the measurement data preparation, the measurement data are subjected to a signal transformation. This consists of a Fourier analysis (12). The result of the Fourier analysis (12) is a spectrogram (13) for the recorded working cycle. The spectrogram (13) serves as an input to the mathematical regression model (14) and together with the latter performs the valve clearance evaluation (15). Typical frequencies for the valve clearance in the regression model (14) are evaluated and a condition for the valve clearance (17) is determined. Simultaneously, the release conditions are checked again (7) so that when the release (8) is issued, measurement signals are again evaluated at the same operating point of the internal combustion engine. After five successive valve clearance detections, the release for a new process run is blocked. Meanwhile, an average value (16) is calculated from a maximum of five valve clearance collected, and this is a measurement for the real valve clearance (17). In a further step, the determined valve clearance (17) is transferred (18) to a central server (5, 19) by means of a data transfer unit (4) and to the control unit of the internal combustion engine (21). The valve clearance (17) acts on the control unit of the internal combustion engine as an input control in the fault manager and/or in further functions. The valve clearance is further processed (20) on the central server (5) in such a way that a valve clearance and maintenance history is created for the vehicle, that the valve clearance is included in statistical vehicle fleet evaluations, and that a specific maintenance deployment is planned and the necessary resource deployment coordinated.

Figure 2:
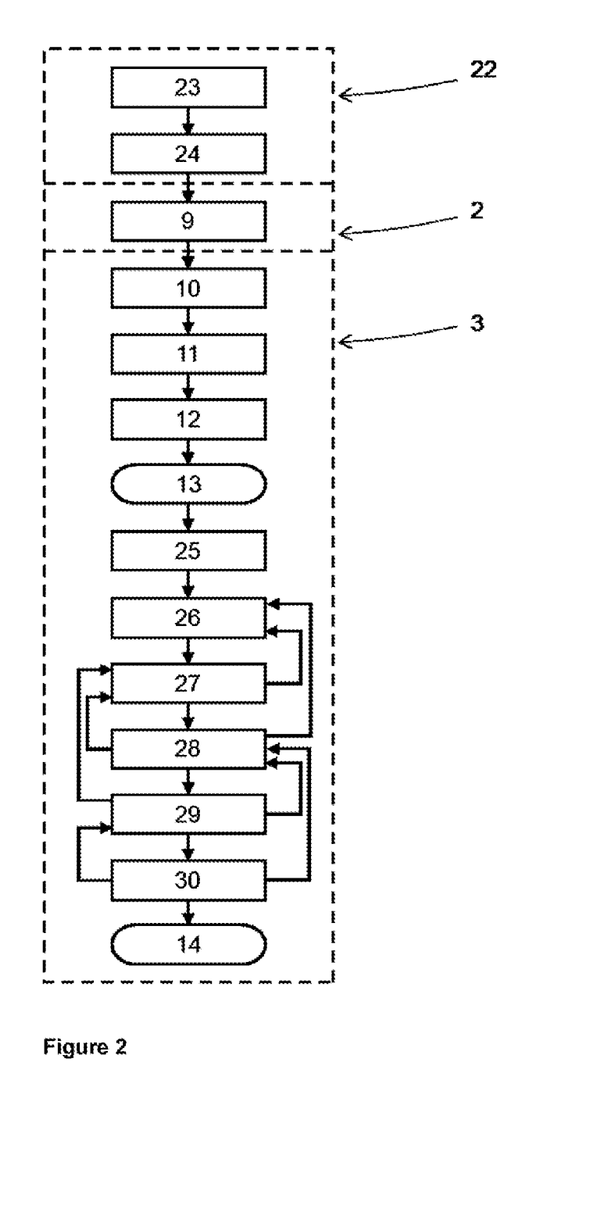
FIG. 2: Schematic flowchart for developing the mathematical regression model for determining the state of wear of a component of an internal combustion engine.

FIG. 2 shows the schematic flow chart for developing the mathematical regression model (14) and adapting the inventive method to the internal combustion engine used. Measurement data from defined valve clearances, sensor positions and combinations of speed and load are determined. In a first step, the valve clearance selected for the experiment is set (23). The valve clearances are analyzed for an area adapted to the valve drive of the internal combustion engine. The speed and load combinations are formed from the engine map support points characteristic of the internal combustion engine. The knock sensor is retrofitted and attached to the cylinder head of the internal combustion engine at various positions where screw connections already exist. The internal combustion engine is operated as a partial system in the form of its cylinder head of a component test stand (22). In a first step, a defined valve clearance is set (23) in all gas exchange valves, and in a second step a defined operating point of the subsystem of the internal combustion engine is set (24). The following steps take place in accordance with the steps of the inventive method with regard to the measurement signal recording and measurement signal transmission (9) by the knock sensor (2) and measurement signal synchronization (10), measurement data decoding (11), signal transformation (12) and spectrogram setting (13) by means of evaluation electronics (3). In a further step, the thus collected measurement data sets of the spectrograms (13) are aggregated (25) in a result matrix and are plotted (26) into a first regression model. Based on the results of the first regression model (26), further steps for optimizing the model quality are carried out. In a further step, the selected sensor position is adapted (27) so that the regression model can be reevaluated (26). In a further step, the measurement data of the spectrograms are filtered (28) so that the selectivity of the model is increased. After this step, the sensor position (27) and the regression model (26) can be adjusted anew. In a further step, the features of the spectrograms (13) are reduced (29), wherein irrelevant and redundant features are removed. After this step, the measurement data filtering (28) and the sensor position (27) can be adjusted anew. In a final step, the result of the current iteration is evaluated (30) and either a further iteration is carried out in order to further improve the model quality, or the development of the regression model is concluded and the regression model (14) is created.

Figure 3:
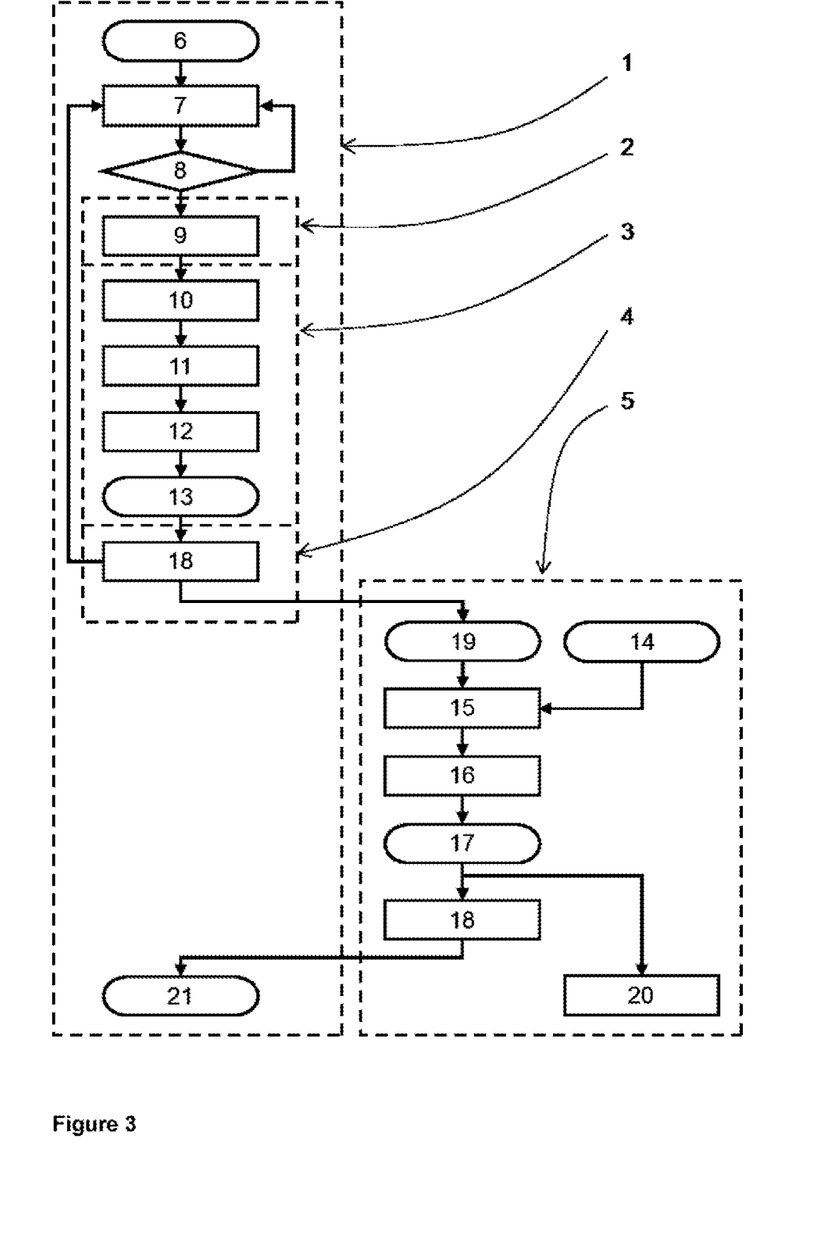
FIG. 3: Schematic flowchart of the inventive method, wherein the internal combustion engine and the evaluation electronics are arranged in a vehicle and the spectrograms are transferred to a central server for evaluation and further processing.

In FIG. 3 the schematic flow chart of the inventive method is shown, wherein the internal combustion engine and the evaluation electronics (3) are arranged in a vehicle and the spectrograms are transferred to a central server (5) for evaluation and further processing. The method steps relating to the operation of the internal combustion engine (6), checking the release conditions (7), issuing the release (8), measurement signal recording and transmission (9) to the evaluation electronics (3) by the knock sensor (2), measurement signal synchronization (10), measurement data decoding (11), signal transformation (12) and spectrogram generation (13) are analogous to the embodiment of the inventive method according to FIG. 1. The generated spectrograms (13) are transferred (5, 18) to a central server by a data transfer unit (4). Simultaneously, the release conditions are checked again (7) so that when the release (8) is issued, measurement signals are again evaluated at the same operating point of the internal combustion engine. After five successive valve clearance detections, the release for a new process run is blocked. The transferred data (19) of the spectrograms (13) serves as an input to the mathematical regression model (14) which carries out the valve clearance evaluation (15). Typical frequencies for the valve clearance are evaluated in the regression model (14), which determines the valve clearance (17) as a real value. Meanwhile, an average value (16) is calculated from a maximum of five valve clearance collected, and this is a measurement for the real valve clearance (17). In a further step, the determined valve clearance (17) is transferred (18) to the control unit of the internal combustion engine by means of the data transfer unit (4) and the valve clearance (17) is further processed on the server (20) in such a way that a valve clearance and maintenance history for the vehicle (1) is created so that the valve clearance (17) is included in statistical vehicle fleet evaluations, a specific maintenance operation is planned and the necessary resource deployment is coordinated. The valve clearance (17) on the control unit of the internal combustion engine serves as an input variable in the error manager and/or in further functions. The valve clearance (17) is further processed (20) on the central server.

Figure 4:
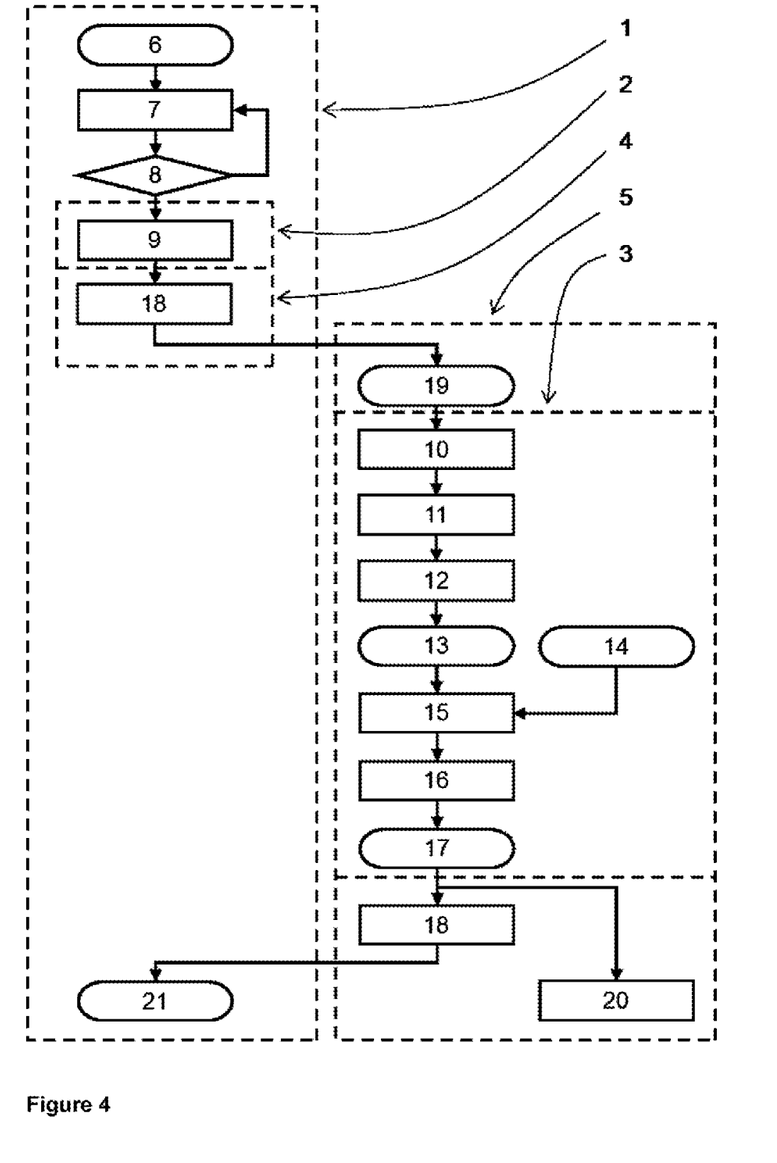
FIG. 4: Schematic flowchart of the inventive method, wherein the internal combustion engine is arranged in a vehicle and the evaluation electronics are arranged on a central server, wherein the measurement signals are transferred to the central server for measurement data processing, evaluation and further processing.

In FIG. 4 the schematic flow chart of the inventive method is shown, wherein the internal combustion engine is arranged in a vehicle and the evaluation electronics (3) are arranged on a central server (5), wherein the measurement signals are transferred to the central server for measurement data preparation, evaluation and further processing. The process steps relating to the operation of the internal combustion engine (6), checking of the release conditions (7), granting of the release (8) and measurement signal recording (9) by the knock sensor (2) are analogous to the embodiment of the inventive method according to FIG. 1. The recorded measurement signals (9) are transferred (5, 18) to a central server by a data transfer unit (4). The evaluation electronics (3) are coupled to the central server (5). The data (19) transmitted to the central server (5) are evaluated in relation to the process steps of measurement signal synchronization (10), measurement data decoding (11), signal transformation (12) and spectrogram generation (13), valve clearance evaluation (15) by means of a regression model (14) and averaging (16) analogously to the implementation of the inventive method according to FIG. 1. After the release (8) has been detected, measurement data of up to five consecutive work cycles are recorded by the knock sensor (9) and transferred (18) to the central server (5). In a further step, the determined valve clearance (17) is transferred (18) to the control unit of the internal combustion engine by means of the data transfer unit (4) and the valve clearance (17) is further processed on the server (20) in such a way that a valve clearance and maintenance history is created for the vehicle, that the valve clearance (17) is included in statistical vehicle fleet evaluations and that a specific maintenance operation is planned and the necessary resource use is coordinated. The valve clearance (17) on the control unit of the internal combustion engine serves as an input variable in the error manager and/or in further functions. The valve clearance (17) is further processed (20) on the central server (5).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1 Motor vehicle
2 Structure-borne sound sensor
3 Evaluation electronics
4 Data transfer unit
5 Central server
6 Internal combustion engine in operation
7 Check release conditions
8 Granting of release
9 Measurement signal recording
10 Measurement signal synchronization
11 Measurement data decoding
12 Signal transformation
13 Spectrogram
14 Regression model
15 Valve clearance evaluation
16 Averaging
17 Valve clearance
18 Data transfer
19 Data on server
20 Further processing of data
21 Data on control unit
22 Test bench
23 Set valve clearance
24 Set operating point
25 Aggregate measurement data
26 Preselect regression model
27 Adjust sensor position
28 Filter measurement data
29 Reduce features
30 Evaluate result

What is claimed is:

1. A method for predictive maintenance of components of an internal combustion engine by a structure-borne sound sensor, comprising:
recording vibrations of the components of the internal combustion engine by at least one structure-borne sound sensor; and
during operation of the internal combustion engine, continuously checking a release for diagnosing a wear condition of the components of the internal combustion engine,
wherein the at least one structure-borne sound sensor, which is arranged at one or more positions on the internal combustion engine, records measurement signals and forward them to evaluation electronics,
wherein the measurement signals are time-synchronized to a characteristic state of the internal combustion engine or the measurement signal recording is time-triggered,
wherein the time-synchronized or triggered measurement signals are decoded into measurement data,
wherein the decoded measurement data is subjected to a signal transformation,
wherein one or more spectrograms are generated from the signal transformation,
wherein the one or more spectrograms are evaluated by one or more mathematical regression models in the evaluation electronics, and the release for diagnosing the state of wear of the components of the internal combustion engine is simultaneously re-tested,
wherein, when a release is issued, a process, starting with the signal recording by the structure-borne sound sensor or sensors, runs again until the release expires,
wherein an average value is calculated from evaluations generated in this manner so that the average value represents a measurement of the wear of the analyzed component, and
wherein the average value is transferred to further units for further processing.

2. The method according to claim 1, wherein the components of the internal combustion engine comprise a valve drive and/or pistons and/or bearings and/or injection valves and/or turbochargers.

3. The method according to claim 1, wherein the release for diagnosing the state of wear of components of the internal combustion engine comprises a rotational speed and/or a torque and/or a speed and/or a fluid temperature and/or a number of cycles of the method immediately followed up to now.

4. The method according to claim 1, wherein a position of the at least one structure-borne sound sensor is or are optimized to a minimum distance from the component or components to be analyzed, and
wherein an axial orientation of the at least one structure-borne sound sensor is approximated to a preferred direction of the vibration propagation.

5. The method according to claim 1, wherein the at least one structure-borne sound sensor comprises a knock sensor.

6. The method according to claim 1, wherein the characteristic state of the internal combustion engine for synchronizing the measuring signals comprises a crank angle.

7. The method according to claim 1, wherein the signal transformation comprises a Fourier analysis.

8. The method according to claim 1, wherein a parameterization of the regression model, with which measurement data are compared and an evaluation of which is evaluated as a participant for the wear state, is optimized by machine learning.

9. The method according to claim 1, wherein the wear condition comprises a lash and/or a retention and/or a shape retention and/or a surface condition and/or a functional integrity.

10. The method according to claim 1, wherein the further units to which the average value is transferred comprise:
a control unit of the internal combustion engine on which the latter is processed as an input in further functions, or
a central server on which a wear and maintenance history is generated and/or a statistical fleet evaluation of structurally identical internal combustion engines is developed and/or a planning of a specific maintenance input is carried out and/or a coordination of resources is planned.

* * * * *